United States Patent Office 3,174,943
Patented Mar. 23, 1965

3,174,943
PLASTICIZED UREA-FORMALDEHYDE RESINS
Peter Blackman, Cranston, and John P. Conbere, Barrington, R.I., assignors to I.C.I./Organics/Inc., a corporation of Rhode Island
No Drawing. Filed Aug. 8, 1960, Ser. No. 47,926
11 Claims. (Cl. 260—33.2)

The present invention relates to plasticized urea formaldehyde resins and compositions containing the same.

The principal object of the invention is to provide novel urea formaldehyde resin compositions of improved flexibility. A more particular object of the invention is to provide urea formaldehyde resin compositions which can be cured into flexible films and coatings having other desirable characteristics. Additional objects will also be hereinafter apparent.

Broadly stated, the compositions of the invention comprise a urea-formaldehyde resin, and as a plasticizer therefor, an effective amount of an adduct of ethylene oxide and the oxo alcohol which is commercially known as hexadecyl alcohol, said adduct having the formula:

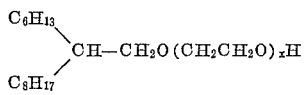

wherein $x$ has a value between 25 and 40. These adducts may be prepared by the addition of 25 to 40 moles of ethylene oxide to hexadecyl alcohol (obtained by the oxo process) at elevated temperatures (e.g., 130 to 170° C.) under alkaline catalytic conditions. Usually, the reaction is carried out using any of the following representative catalysts: sodium hydroxide, sodium alkoxides, sodium carbonate, and sodium.

Urea-formaldehyde resins, containing one or more plasticizers according to the present invention, can be cured into highly desirable plasticized films or other products. Typically suitable curing conditions include heating at 120 to 160° C., for 10 to 60 minutes. If desired, an appropriate urea-formaldehyde polymerization catalyst, e.g., an aminol salt solution, may also be included in the plasticizer/resin mix.

The plasticizers used herein are uniquely compatible with urea-formaldehyde resins. They do not exude from the cured resin mixture under normal conditions and they impart a high degree of flexibility to the cured composition. This property of flexibility is unexpected since it is not usually associated with thermosetting resins.

Cured urea-formaldehyde resins containing at least one plasticizer according to the invention may be light-transmitting, that is, either translucent or transparent. The resinous compositions may be elastic in some cases and they are also water-insoluble and water impervious. Accordingly, the compositions of the invention are particularly attractive for the formation of moisture protective films. Pigments may be incorporated in the plasticized resins and, if desired, the plasticized resin, with or without pigment, may be incorporated in paper, textiles or the like or used to provide surface coatings thereon. Paper containing the plasticized resin herein is not brittle, as is normally the case with usual urea-formaldehyde resins. Paper coated with the plasticized resin mixture of the invention also has a high gloss surface which does not fracture on folding.

One very unique and advantageous characteristic of the plasticized products of the invention is the ability to operate from an aqueous system. Formation of protective films of urea-formaldehyde resins plasticized with alkyd resins is known, but these require organic media such as xylene or butyl alcohol. With the present invention, films may be formed by casting a water solution of pre-polymeric urea formaldehyde syrup and the plasticizer and then drying and baking to obtain a highly attractive, flexible film.

The plasticizer used herein may be incorporated into the urea-formaldehyde resin in any convenient fashion, desirably but not necessarily in aqueous solution. The resin which is used may have any degree of polymerization although it is preferably a heat-curable pre-polymerized syrup. Usually, the plasticizer will comprise from 1 to 50% by weight of the final plasticized composition, desirably 10 to 20%.

As mentioned heretofore, pigments, typically titanium dioxide, may be added to the plasticized urea formaldehyde compositions of the invention. Usually, the pigment total will amount to from 1 to 20% by weight of the final composition although other proportions can be used. It will also be appreciated that other conventional ingredients may be included in the plasticized compositions of the invention.

The invention is illustrated, but not limited, by the following examples wherein parts and percentages are by weight unless otherwise stated:

Example I 3.6 g. of a 50% aqueous solution of a partially polymerized urea formaldehyde resin are mixed with 0.18 g. of the condensation product of hexadecyl alcohol with 25 moles of ethylene oxide, and 0.1 g. of an aminol salt catalyst (e.g., 2-amino, 2-methyl propanol hydrochloride) is added. An even layer of the mix is deposited on a glass plate by use of a draw bar. The water is removed by allowing to dry overnight, and the film is baked for 10 minutes at 300° F. to produce a translucent, flexible film with no exuding or tackiness.

Example II

Films are prepared similarly to Example I, but with the condensation products of hexadecyl alcohol and 30, 35 or 40 moles of ethylene oxide, respectively, with essentially equivalent results.

Example III

A composition is made up as described in Example I, and including 0.18 g. of a commercially available titanium dioxide. A pliable and flexible, water resistant film is thereby prepared.

It will be appreciated that various modifications may be made in the invention as described above without departing from the scope and spirit thereof. Thus, for example, it will be apparent that the urea-formaldehyde polymer may be used in different concentrations from that shown above. Additionally, in lieu of separate drying and baking steps, it may be desirable in some instances to bake the plasticized films directly thus eliminating the drying time. The plasticized urea-formaldehyde compositions may also be made into forms other than films where flexible urea-formaldehyde resins are desirable. Accordingly, the scope of the invention is defined in the following claims wherein

We claim:
1. A composition comprising urea-formaldehyde resin and, as a plasticizer therefor, an effective amount of an adduct of ethylene oxide and hexadecyl alcohol obtained by the oxo process, said adduct having the formula:

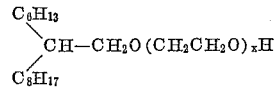

wherein $x$ has a value between 25 and 40.

2. The composition of claim 1 wherein said composition is heat-curable.

3. The composition of claim 1 wherein said composition is heat-cured.

4. The composition of claim 1 containing from 1 to 50% by weight of said plasticizer, based on the weight of plasticized composition.

5. The composition of claim 1 including a pigment.

6. Paper coated with the composition of claim 1, said coated paper being nonbrittle and having a high gloss surface which does not fracture on folding.

7. The process which comprises forming a film from the composition of claim 1 in water and removing the water therefrom to obtain a flexible, water-resistant film.

8. The process of claim 7 wherein said resin is a prepolymeric urea-formaldehyde syrup and said film is obtained by casting an aqueous mixture of the syrup and plasticizer and then baking.

9. A nontacky, light-transmitting moisture protective film of a plasticized urea-formaldehyde resin composition, said composition comprising a cured thermosetting urea-formaldehyde resin and as a plasticizer therefor, an effective amount of an adduct of ethylene oxide and hexadecyl alcohol obtained by the oxo process, said adduct having the formula:

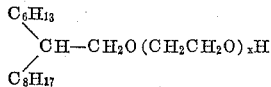

wherein $x$ has a value between 25 and 40, said plasticizer being uniquely compatible with said resin and not exuding therefrom under normal conditions, said plasticizer imparting a high degree of flexibility to said cured resin, and said plasticized and cured resin composition being water insoluble and water impervious.

10. The film of claim 9 wherein said plasticized and cured composition is elastic.

11. The film of claim 9 wherein said urea-formaldehyde resin includes an aminol salt as a polymerization catalyst.

References Cited by the Examiner

UNITED STATES PATENTS

| | | | |
|---|---|---|---|
| 1,970,578 | 8/34 | Schoeller et al. | 260—33.2 |
| 2,376,200 | 5/45 | Smidth | 260—29.4 |
| 2,467,160 | 4/49 | Scott | 260—67.6 |
| 2,527,970 | 10/50 | Sokol | 260—33.2 |
| 2,965,678 | 12/60 | Sundberg et al. | 260—33.2 |
| 2,972,587 | 2/61 | Berry | 260—33.2 |

FOREIGN PATENTS

| | | |
|---|---|---|
| 526,488 | 6/56 | Canada. |
| 719,445 | 12/54 | Great Britain. |
| 796,508 | 6/58 | Great Britain. |

MORRIS LIEBMAN, *Primary Examiner.*

DANIEL ARNOLD, WILLIAM G. SHORT, LESLIE H. GASTON, *Examiners.*